(12) United States Patent
Bai et al.

(10) Patent No.: US 9,507,156 B2
(45) Date of Patent: Nov. 29, 2016

(54) LIGHT CONCENTRATING FILM AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Ling Bai, Beijing (CN); Hetao Wang, Beijing (CN); Kun Lu, Beijing (CN); Kai Yan, Beijing (CN); Jingshi Li, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 223 days.

(21) Appl. No.: 14/314,628

(22) Filed: Jun. 25, 2014

(65) Prior Publication Data
US 2015/0309318 A1 Oct. 29, 2015

(30) Foreign Application Priority Data
Apr. 24, 2014 (CN) .......................... 2014 1 0168665

(51) Int. Cl.
*G02B 6/10* (2006.01)
*G02B 27/09* (2006.01)
*G02F 1/1335* (2006.01)

(52) U.S. Cl.
CPC ....... *G02B 27/0977* (2013.01); *G02B 27/0955* (2013.01); *G02F 1/1335* (2013.01)

(58) Field of Classification Search
CPC .......... G02B 27/0977; G02B 27/0955; G02B 6/011; G02B 6/003; G02B 6/002; G02B 6/005; G02B 6/053; G02B 6/0051; G02B 6/0076; G02F 1/1335
See application file for complete search history.

(56) References Cited

U.S. PATENT DOCUMENTS 3,279,314 A * 10/1966 Miller .................. G03B 21/625
353/70
4,330,813 A * 5/1982 Deutsch ............ G02F 1/133526
345/84

(Continued)

FOREIGN PATENT DOCUMENTS

| CN | 101561522 A | 10/2009 |
| CN | 102721004 A | 10/2012 |
| CN | 103185907 A | 7/2013 |

OTHER PUBLICATIONS

First Office Action regarding Chinese application No. 201410168665.3, dated Mar. 1, 2016. Translation provided by Dragon Intellectual Property Law Firm.

*Primary Examiner* — Jong-Suk (James) Lee
*Assistant Examiner* — Leah S Macchiarolo
(74) *Attorney, Agent, or Firm* — Harness, Dickey & Pierce, P.L.C.

(57) ABSTRACT

The present disclosure provides a light concentrating film and a display device. The light concentrating film has a planar shape, and includes multiple light concentrating units which are connected to each other so as to concentrate the incident light on a light incoming side of the light concentrating film at the light outgoing side of the light concentrating film. The display device of the present disclosure includes a display panel and the light concentrating film of the present disclosure, and the light outgoing side of the light concentrating film faces a light incoming side of the display panel.

17 Claims, 6 Drawing Sheets

(56) References Cited

U.S. PATENT DOCUMENTS

| | | | |
|---|---|---|---|
| 5,396,350 A * | 3/1995 | Beeson | F21V 5/02 349/62 |
| 5,396,406 A * | 3/1995 | Ketchpel | G02B 6/0003 349/62 |
| 5,598,281 A * | 1/1997 | Zimmerman | G02F 1/133606 349/5 |
| 5,839,812 A * | 11/1998 | Ge | G02B 6/005 349/64 |
| 6,498,685 B1 * | 12/2002 | Johnson | B81C 1/0038 347/241 |
| 6,636,355 B2 * | 10/2003 | Moshrefzadeh | G03B 21/625 359/453 |
| 7,360,936 B2 * | 4/2008 | Abu-Ageel | G02B 5/045 257/95 |
| 7,616,368 B2 * | 11/2009 | Hagood, IV | G02B 17/002 345/102 |
| 7,806,547 B2 * | 10/2010 | Benitez | G02B 6/0036 349/64 |
| 8,004,760 B2 * | 8/2011 | Liu | G03B 21/62 353/74 |
| 8,058,804 B2 * | 11/2011 | Yoon | H01J 11/12 313/112 |
| 8,226,256 B2 * | 7/2012 | Urabe | G02B 6/0018 349/62 |
| 9,250,508 B1 * | 2/2016 | Fu | G03B 21/62 |
| 2005/0200773 A1 | 9/2005 | Chang | |
| 2005/0259198 A1 * | 11/2005 | Lubart | G02B 17/002 349/113 |
| 2006/0087732 A1 * | 4/2006 | Shinbo | G03B 21/625 359/455 |
| 2007/0171523 A1 * | 7/2007 | Yoon | G03B 21/625 359/455 |
| 2010/0060817 A1 | 3/2010 | Park et al. | |
| 2011/0157887 A1 * | 6/2011 | Jeong | G02B 5/201 362/235 |
| 2011/0316764 A1 * | 12/2011 | Parry-Jones | G02B 26/005 345/60 |

* cited by examiner

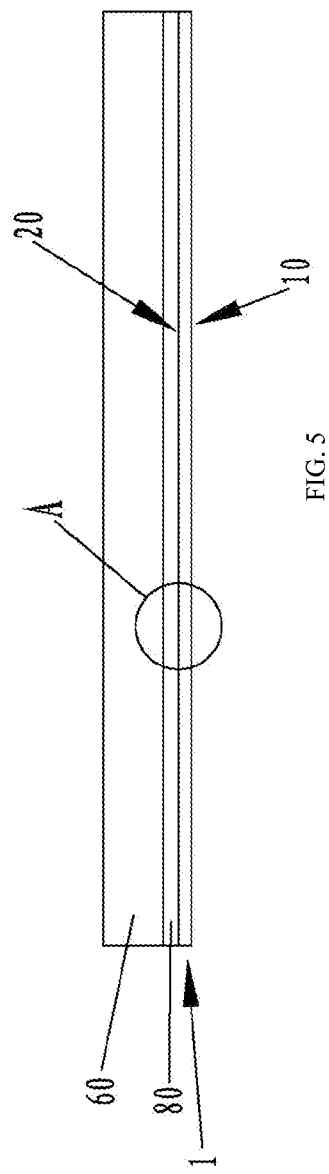
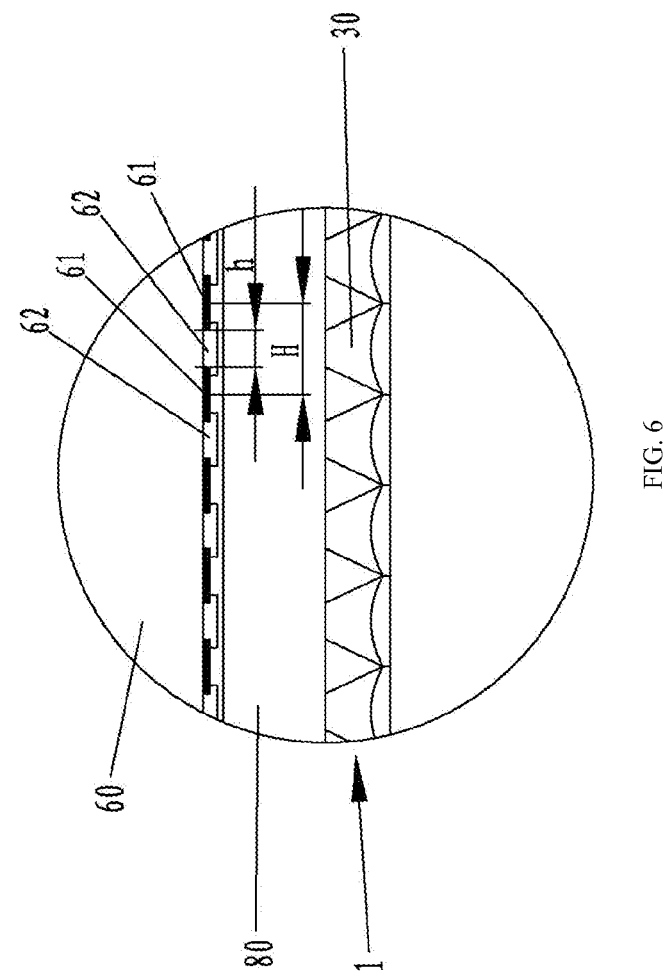
FIG. 5
FIG. 6

LIGHT CONCENTRATING FILM AND DISPLAY DEVICE

CROSS REFERENCE OF THE RELATED APPLICATIONS

The present application claims priority to and incorporates by reference the entire contents of Chinese priority document 201410168665.3, filed in China on Apr. 24, 2014.

TECHNICAL FIELD

The present disclosure relates to a display device, and particularly to a light concentrating film and a display device.

BACKGROUND

With the rapid development of the display technology, the liquid crystal display (LCD) prevail the field of the panel display as a display device. The LCD operates through driving the liquid crystals between two conductive glasses by using the electric field formed between the two conductive glasses. Since a crystal is unable to emit light by itself and thus the LCD needs to achieve the transmission or reflection display by means of an external light source, most of the LCDs may include a backlight module.

During the operation of the existing LCDs, the natural light or the light emitted from the backlight module will be significantly lost during the transmission to the display panel, leading to the problem that the brightness of the display is not enough. In order to solve this problem, the power of the backlight module may be increased. However, this may consume a lot of energy and furthermore may be adverse to the light-weight of the display device.

SUMMARY

An object of the present disclosure is to provide a light concentrating film and a display device which may effectively improve the display brightness of a display panel and be benefit to the light-weight of a display device.

A light concentrating film is provided according to the present disclosure, the light concentrating film may have a planar shape and include a plurality of light concentrating units, the plurality of light concentrating units are connected to each other such that incident light on a light incoming side of the light-concentraing film is concentrated to a light outgoing side of the light concentrating film.

Each of the light concentrating units may comprise a light guide, the light guide may be adapted to concentrate the incident light on the light incoming side of the light concentrating film at the light outgoing side of the light concentrating film, and side walls of the light guides may be connected to each other.

The light guide may have a truncated cone shape, and the light guide may have a larger diameter on a light incoming side of the light guide than a light outgoing side of the light guide.

The light guide may be a solid truncated cone which has only one type of interior media.

Side walls of two neighboring light guides may be connected to each other through a filling, and the material of the filling may have a smaller refractive index than the material of the light guides.

The light concentrating unit may further comprise a light concentrating mirror disposed on the light incoming side of the light guide, and the light concentrating mirror may be adapted to concentrate the incident light on the light incoming side of the light concentrating film at the light incoming side of the light guide.

The light-concentrating mirror may be a convex lens, and a principal optical axis of the convex lens may be aligned with the axis of the light guide.

The light outgoing side of the light concentrating mirror may be connected to the light incoming side of the light guide.

The light incoming side of the light concentrating mirror may have a planar shape, and the light outgoing side of the light concentrating mirror may have a convex shape.

A plurality of sides of the light concentrating mirrors may be directly connected to each other or may be indirectly connected to each other by a mediator.

Each of the light concentrating units may be a light concentrating mirror which is adapted to concentrate the indicent light on the light incoming side of the light concentrating film at the light outgoing side of the light concentrating film, and sides of the light concentrating mirrors may be connected to each other.

A display device, comprising a display panel and the light-concentraing film of the present disclosure, the light outgoing side of the light concentrating film facing a light incoming side of the display panel.

The diameter of each of the light guide on the light incoming side may be equal to a distance H between centers of two neighboring black matrixes on the display panel, the diameter of the light guide on the light outgoing side may be equal to a distance h between two opposite edges of two neighboring black matrixes on the display panel, and the light outgoing side of the light guide may be opposite to a subpixel between black matrixes on the display panel.

The display device may further comprise an anti-reflective film which is disposed between the display panel and the light concentrating film.

The display device may further comprise a backlight module which is disposed on the light incoming side of the light concentrating film.

The display device may be at least one of a liquid crystal panel, an electronic paper, a liquid crystal TV, a LCD, a digital photo frame, a mobile phone, a tablet computer, and an outdoor display.

According to the light concentrating film of the present disclosure, multiple light concentrating units form a film having a planar shape, which is used to concentrate the incident light on the light incoming side of the film at the light outgoing side of the film, so as to achieve a light concentrating function. The light concentrating film may effectively improve the displaying brightness of the display panel and be benefit to the light-weight of the display device. The display device according to an embodiment of the present disclosure is provided with the light concentrating film of the present disclosure, and the brightness of the light captured by such display panel may be greatly improved. The display device of the present disclosure may improve the displaying brightness and have the advantage of being energy saving and environment friendly.

BRIEF DESCRIPTION OF THE DRAWINGS

FIG. 5 is a structural schematic of a display device according to an embodiment of the present disclosure;

FIG. 6 is a partially enlarged view of section A as shown in FIG. 5; and

DETAILED DESCRIPTION

In the following, the present disclosure will be further described in conjunction with the appended drawings and the embodiments, such that the skilled in the art can better understand and implement the present disclosure. However, the recited embodiments will not limit the present disclosure.

Figure 1:
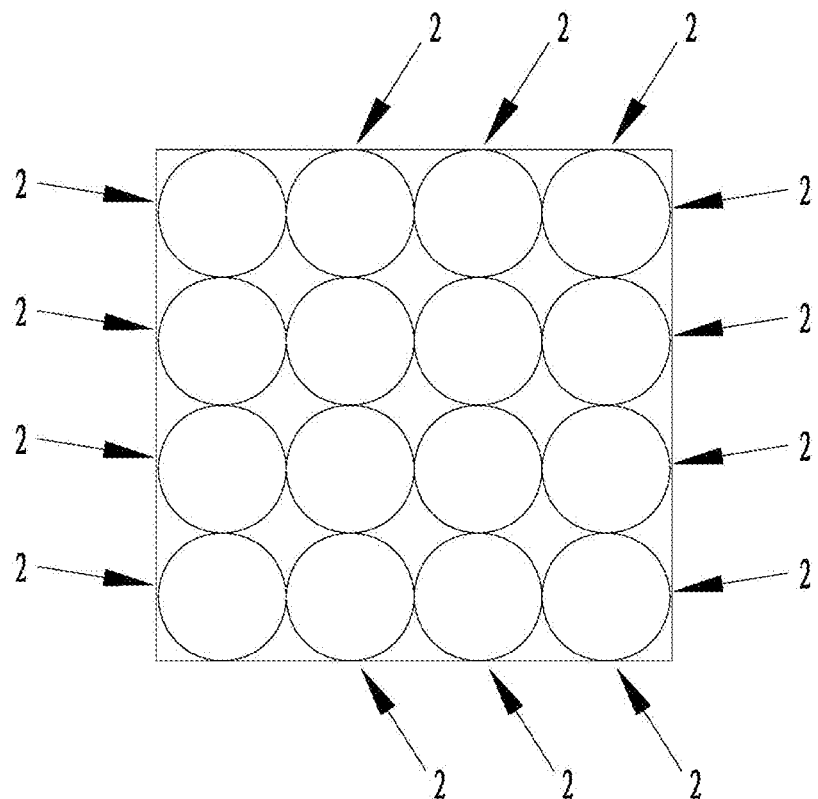
FIG. 1 is a structural schematic of a light concentrating film according to the present disclosure.
Figure 2:
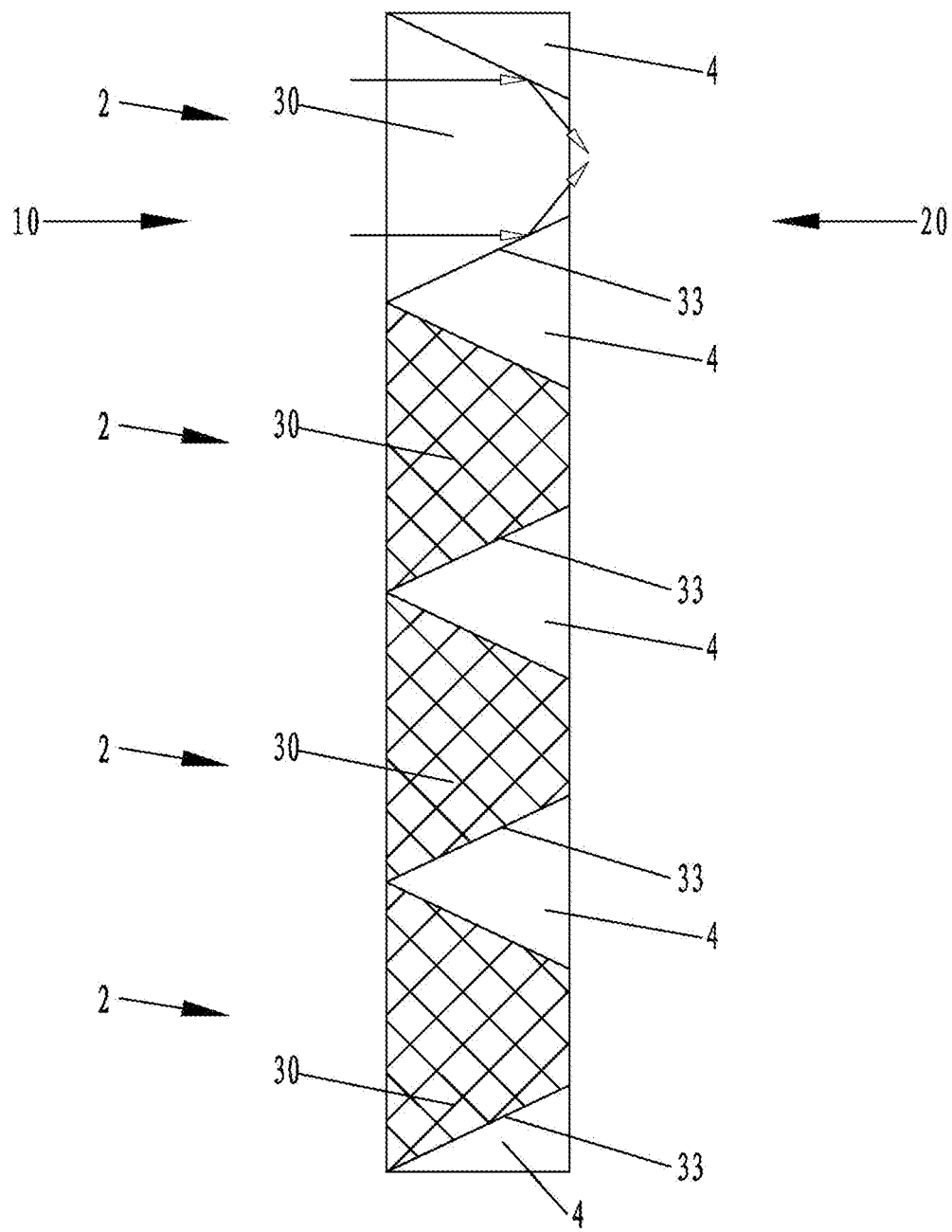
FIG. 2 is a right section view of a structural schematic of a light concentrating film according to a first embodiment of the present disclosure.

As shown in FIG. 1 and FIG. 2, a light concentrating film of the present disclosure has a planar shape. The light concentrating film includes multiple light concentrating units 2 which are connected to each other such that concentrate incident light on a light incoming side 10 of the light concentrating film at a light outgoing side 20 of the light concentrating film.

First Embodiment

In the light concentrating film according to an embodiment of the present disclosure, the multiple light concentrating units 2 are oriented identically and form the light concentrating film having a planar shape. The light concentrating units 2 are adapted to concentrate incident light on the light incoming side 10 of the light concentrating film at the light outgoing side 20 of the light concentrating film so as to achieve the light concentrating function of the light concentrating film.

In the light concentrating film according to an embodiment of the present disclosure, the light concentrating unit 2 includes a plurality of light guides 30, side walls 33 of which are connected to each other, and the light guides are adapted to concentrate the incident light on the light incoming side 10 of the light concentrating film at the light outgoing side 20 of the light concentrating film.

In the light concentrating film according to an embodiment of the present disclosure, the light guide 30 has a truncated cone shape, and has a larger diameter on a light incoming side of the light guide 30 than a light outgoing side of the light guide 30.

The light guide 30 is a solid truncated cone which has only one type of interior media (single media) to ensure that the light propagates stably within the light guide 30.

FIG. 2 shows the propagating path of the light after entering the light guide 30. As shown in FIG. 2, the light guide 30 has a larger diameter on the light incoming side than the light outgoing side, such that more light may be absorbed into the light guide. The light will emit from the light outgoing side of the light guide 30 having a smaller diameter after reflected one or more times, and thus the light concentrating function of the light concentrating film may be achieved.

In the light concentrating film of present disclosure, the multiple light concentrating units 2 may be directly connected to each other, or may be indirectly connected to each other by a mediator.

In the light concentrating film according to an embodiment of the present disclosure, side walls of two neighboring light guides 30 are connected to each other through a filling 4. In order to guarantee total reflection of the light within the light guide and avoid the refraction of the light to a zone occupied by the filling 4 as much as possible, the filling 4 has a smaller refractive index than the light guide 30.

Second Embodiment

Figure 3:
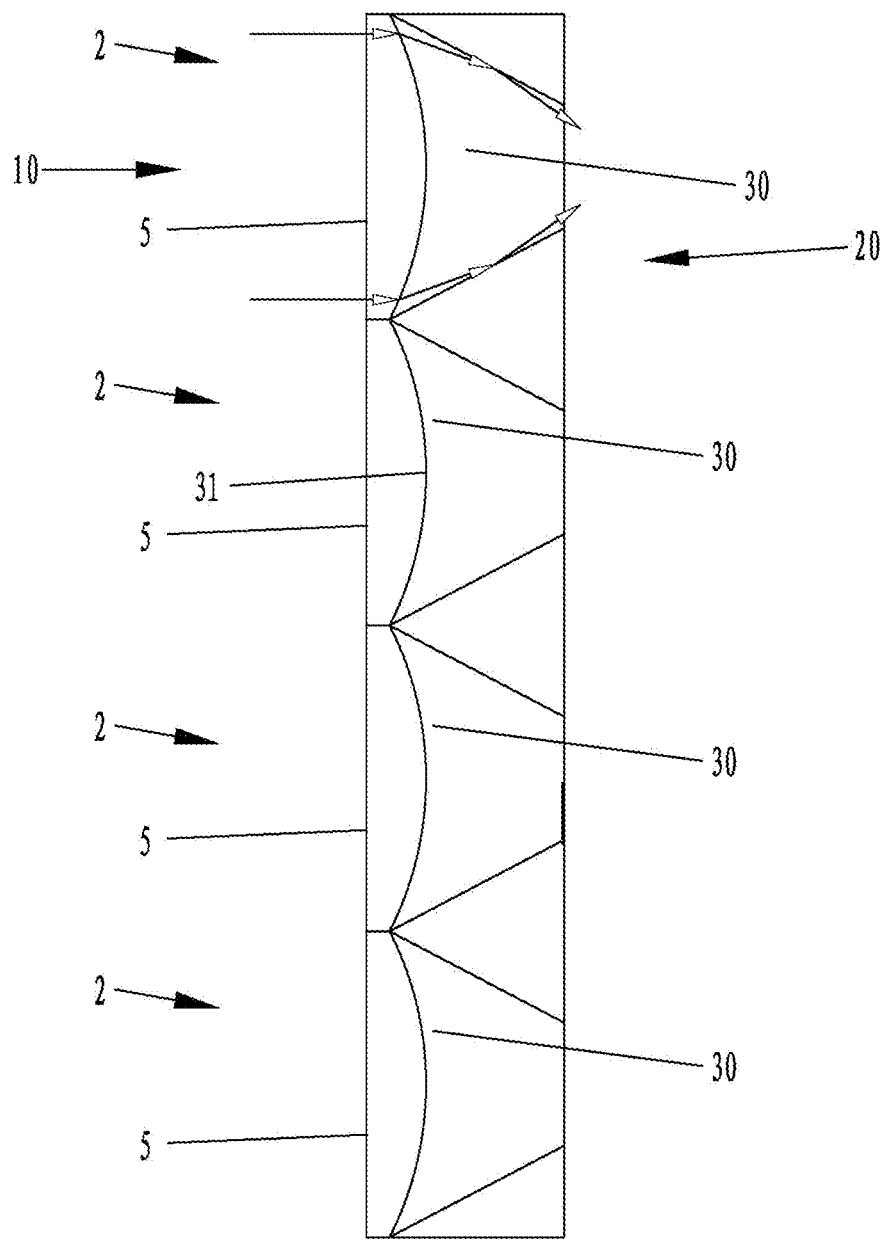
FIG. 3 is a right section view of a structural schematic of a light concentrating film according to a second embodiment of the present disclosure.

Referring to the FIG. 3, this embodiment is different from the first embodiment in that the light concentrating unit 2 further includes a light concentrating mirror 5 which is disposed on the light incoming side of the light guide 30 and adapted to concentrate the incident light on the light incoming side 10 of the light concentrating film at the light incoming side of the light guide 30.

In the light concentrating film according to this embodiment of the disclosure, the light concentrating mirror 5 is a convex lens, and a principal optical axis is aligned with a axis of the light guide 30.

FIG. 3 shows the propagation path of the light after entering into the light concentrating mirror 5. As shown in FIG. 3, the light concentrating mirror 5 is used to strengthen the light concentrating effect of the light concentrating film, i.e., the light concentrating film 5 concentrates the incident light on the light incoming side 10 of the light concentrating film at the light incoming side of the light guide 30. As such, the intensity of the light entering into the light guide 30 will be significantly improved, and thus the light emitted from the light outgoing side of the light guide 30 will be greatly improved.

In the light concentrating film according to the embodiment of the present disclosure, the light outgoing side of the light concentrating mirror 5 is connected to the light incoming side of the light guide 30. Particularly, according to this embodiment, the light-entering side of the light guide 30 is connected to mirror surface of the light concentrating mirror 5. In order to guarantee a stable structure, the diameter of the light guide 30 on the light incoming side fits to the diameter of the light concentrating mirror 5. The light incoming side of the light guide 30 may be connected to the light concentrating mirror 5 in a way of bonding or clamping.

In a light concentrating film according to other embodiments of the present disclosure, the diameter of the light guide 30 on the light incoming side may be smaller than the diameter of the light concentrating mirror 5, i.e., the light incoming side of the light guide 30 is connected to a center of the mirror surface of the light concentrating mirror 5. As such, the intensity of the light incoming into the light guide 30 will be improved.

In a light concentrating film according to other embodiments of the present disclosure, the light concentrating mirror 5 may be indirectly connected to the light incoming side of the light guide 30. For example, the light concentrating mirror 5 may be bonded to the light guide 30 through a transparent material.

In order to guarantee a stable structure, the light incoming side of the light concentrating mirror 5 has a plane shape, and the light outgoing side of the light concentrating mirror 5 has a convex shape.

Third Embodiment

Figure 4:
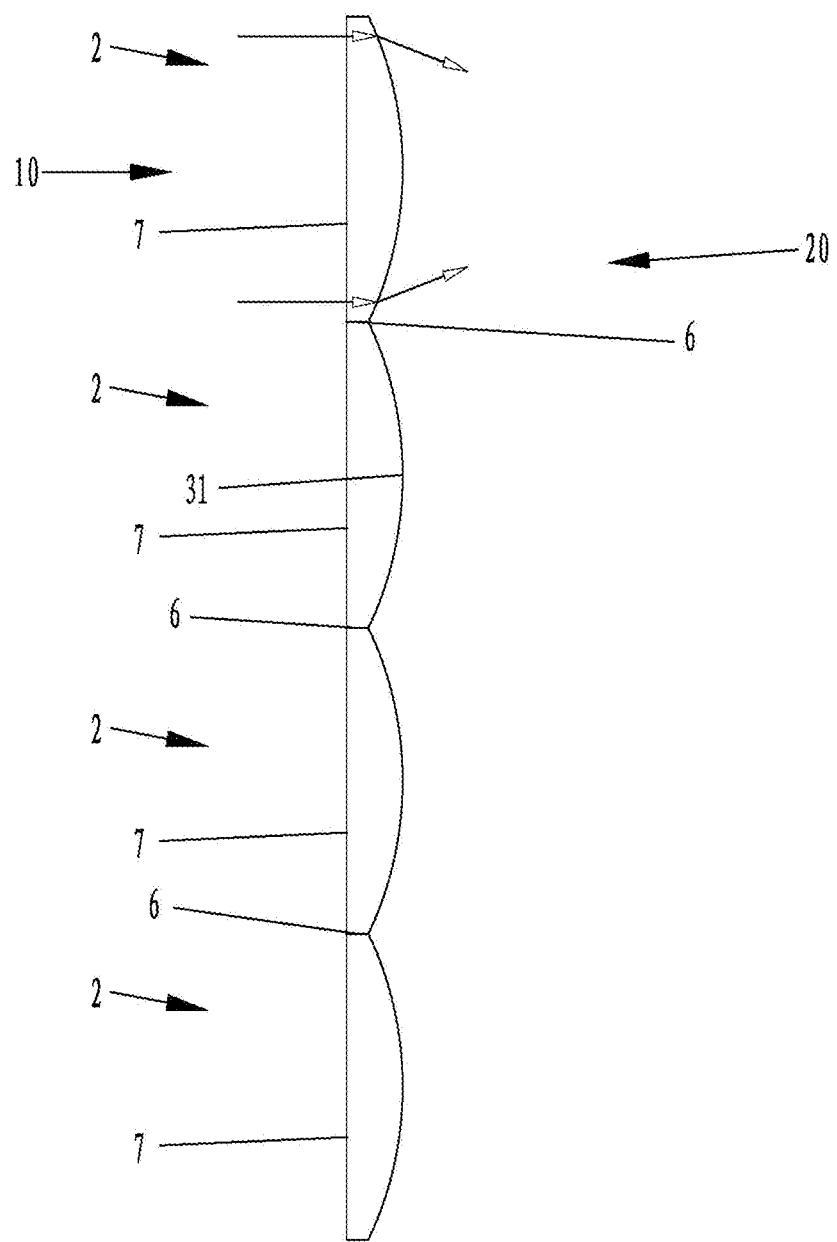
FIG. 4 is a right section view of a structural schematic of a light concentrating film according to a third embodiment of the present disclosure.

Referring to FIG. 4, this embodiment is different from the first embodiment and the second embodiment in that the light concentrating units 2 are merely light concentrating mirrors 7 which are convex lenses. Sides 6 of the light concentrating mirrors 7 are connected to each other. The light concentrating mirrors 7 are used to concentrate the incident light on the light incoming side 10 of the light concentrating film at the light outgoing side 20 of the light concentrating film.

FIG. 4 shows the propagation path of the light after entering into the light concentrating mirrors 7. In the light concentrating film according to the embodiment of the present disclosure, the light concentrating mirrors 7 are oriented identically and form the light concentrating film having a planar shape. The sides 6 of the light concentrating mirrors 7 may be directly connected to each other, or may be indirectly connected to each other by a mediator (e.g., glue or plastic).

Fourth Embodiment

Referring to FIG. 5, a display device according to an embodiment of the present disclosure includes a display panel 60 and the light-concentrating film 1 of the present disclosure disposed on the back side of the display panel 60. The light outgoing side 20 of the light concentrating film 1 faces the light incoming side of the display panel 60. The light concentrating film 1 is used to concentrate the incident light on the light incoming side 10 of the light concentrating film 1 at the display panel 60.

The display device according to the embodiment of present disclosure is provided with the light concentrating film of the present disclosure. Since the brightness of the light captured by such display panel will be greatly improved, the light concentrating film of the present disclosure may concentrate the incident light (may be environment light) on the light incoming side at the display panel 60 to achieve displaying, without requiring a backlight structure. The display device of the present disclosure is especially applied to outdoor displaying. In addition, since there is no need for a backlight module, the overall thickness of the display device is reduced, which would be beneficial to the light-weight of the display device.

Referring to FIG. 6, according to the present discourse, the diameter of the light guide 30 on the light incoming side of the light concentrating film is equal to the distance H between the centers of two neighboring black matrixes 61 on the display panel 60. The diameter of the light guide 30 on the light outgoing side of the light concentrating film is equal to the distance h between the opposite edges of two neighboring black matrixes 61 on the display panel 60. The light outgoing side of the light guide 30 is opposite to the subpixel 62 between the display panel 60 and the black matrix 61.

The display device according to an embodiment of the present disclosure further includes an anti-reflective film 80 disposed between the display panel 60 and the light concentrating film 70. The anti-reflective film 80 is used to reduce the reflection loss on the light incoming side of the display panel 60. The anti-reflective film 80 is a transparent media film.

The display panel 60 may a liquid crystal panel or may be a non-liquid crystal panel with a display function.

Fifth Embodiment

Figure 7:
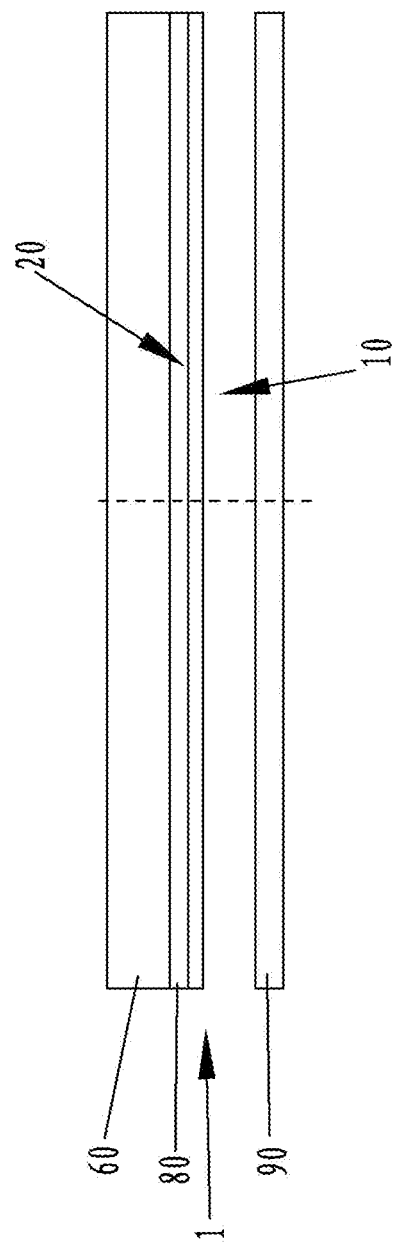
FIG. 7 is a structural schematic of a display device according to another embodiment of the present disclosure.

Referring to FIG. 7, this embodiment of the display device of the present disclosure is different from the fourth embodiment in that the display device further includes a backlight module 90 which is disposed on the light incoming side 10 of the light concentrating film 1 and adapted to supply light to the light concentrating film 1.

The display device according to the embodiment of the invention is provided with the light concentrating film of the present disclosure. The light concentrating film 1 of the present disclosure concentrates the incident light (emitted from the backlight module 90) at the display panel 60 on the light outgoing side 20 of the light concentrating film 1. The light concentrating film of the present discourse can improve the displaying brightness by concentrating the back light, and have the advantage of being energy saving and environment friendly.

The display device according to the present disclosure may include any products or components with a display function, such as a liquid crystal panel, an electronic paper, a liquid crystal TV, a LCD, a digital photo frame, a mobile phone, a tablet computer, or an outdoor display.

The mentioned above are merely the preferable embodiments of the present disclosure. It should be noted that several improvements and retouches may be further made by the ordinary skilled in the art without departing from the principle of the present disclosure, and these improvements and retouches will fall within the protection scope of the present disclosure.

What is claimed is:

1. A light concentrating film, wherein the light concentrating film has a planar shape and comprises a plurality of light guides, side walls of the plurality of the light guides are connected to each other such that incident light on a light incoming side of the light concentrating film is concentrated on a light outgoing side of the light concentrating film,
   wherein the light concentrating film further comprises a plurality of light concentrating convex lenses disposed on the light incoming side of the light guides, and the light concentrating convex lenses are configured to concentrate the incident light on the light incoming side of the light concentrating film on the light incoming side of the light guides;
   wherein surfaces of the light outgoing side of the light concentrating convex lenses are each of a circular arc shape; and
   wherein principal optical axes of the light concentrating convex lenses are aligned with the axes of the light guides, respectively.

2. The light concentrating film according to claim 1, wherein each of the light guides has a truncated cone shape.

3. The light concentrating film according to claim 2, wherein each of the light guides has a larger diameter on a light incoming side of the light guides than a light outgoing side of the light guides.

4. The light concentrating film according to claim 2, wherein each of the light guides is a solid truncated cone which has only one type of interior media.

5. The light concentrating film according to claim 2, wherein side walls of two neighbouring light guides are connected to each other through a filling.

6. The light concentrating film according to claim 5, wherein the material of the filling has a smaller refractive index than the material of the light guides.

7. The light concentrating film according to claim 2, wherein a plurality of sides of the light concentrating convex lenses are directly connected to each other or are indirectly connected to each other by a mediator.

8. The light concentrating film according to claim 1, wherein a plurality of sides of the light concentrating convex lenses are connected to each other.

9. The light concentrating film according to claim 1, wherein the light outgoing side of the light concentrating convex lenses is connected to the light incoming side of the light guides.

10. The light concentrating film according to claim 1, wherein the light incoming side of the light concentrating convex lenses has a planar shape, and the light outgoing side of the light concentrating convex lenses has a convex shape.

11. A display device, comprising a display panel and a light concentrating film, wherein the light concentrating film has a planar shape and comprises a plurality of light guides, side walls of the plurality of light guides are connected to each other such that incident light on a light incoming side of the light concentrating film is concentrated on a light outgoing side of the light concentrating film, wherein the light concentrating film further comprises a plurality of light concentrating convex lenses disposed on the light incoming side of the light guides, and the light concentrating convex lenses are configured to concentrate the incident light on the light incoming side of the light concentrating film on the light incoming side of the light guides;

wherein surfaces of the light outgoing side of the light concentrating convex lenses each is of a circular arc shape; and wherein principal optical axes of the light concentrating convex lenses are aligned with the axes of the light guides respectively.

12. The display device according to claim 11, wherein a diameter of each of the light guides on the light incoming side is equal to a distance H between centers of two neighboring black matrixes on the display panel.

13. The display device according to claim 11, wherein a diameter of each of the light guides on the light outgoing side is equal to a distance h between two opposite edges of two neighboring black matrixes on the display panel.

14. The display device according to claim 11, wherein the light outgoing side of the light guides is opposite to a subpixel between black matrixes on the display panel.

15. The display device according to claim 11, further comprising an anti-reflective film which is disposed between the display panel and the light concentrating film.

16. The display device according to claim 11, further comprising a backlight module which is disposed on the light incoming side of the light concentrating film.

17. The display device according to claim 11, wherein the display device comprises at least one of a liquid crystal panel, an electronic paper, a liquid crystal TV, a liquid crystal display (LCD), a digital photo frame, a mobile phone, a tablet computer, and an outdoor display.

* * * * *